3,625,647
METHOD OF PREPARING CALCIUM-NICKEL
PHOSPHATE CATALYST
Robert A. Stowe, Ludington, Mich., assignor to The Dow
Chemical Company, Midland, Mich.
No Drawing. Filed Mar. 25, 1968, Ser. No. 715,500
Int. Cl. C01b 25/32
U.S. Cl. 23—105
10 Claims

ABSTRACT OF THE DISCLOSURE

Calcium-nickel phosphate catalyst is prepared by reacting a calcium hydroxide solution or slurry with a solution containing phosphoric acid and a nickel compound. The pH is maintained at 7–9.

---

This invention relates to an improved method for preparing a calcium-nickel phosphate catalyst and more particularly pertains to a method for preparing said catalyst by reacting calcium hydroxide with an acidic solution of phosphoric acid and a nickel salt, in such ratio as to provide a product having 6–9, preferably 7.5 to 8.5, moles of Ca per mole of Ni.

Calcium-nickel phosphate catalysts of the type here under consideration are useful for dehydrogenating monoolefins of 4 or more carbon atoms in a chain to the corresponding dienes. Representative of the dehydrogenation reactions are those in which n-butene is converted to 1,3-butadiene, 3-methyl-1-butene is converted to isoprene and 2,3-dimethyl-1-butene is converted to 2,3-dimethyl-1,3-butadiene.

Prior are methods of preparing calcium-nickel phosphate catalysts having the Ca/Ni ratios defined above, consisted of bringing together an acidic solution of a calcium and a nickel salt, such as the chloride or nitrate of the metals and $H_3PO_4$, and gaseous ammonia or ammonium hydroxide solution. The over-all reaction for making catalyst by the prior art process in which the Ca/Ni ratio is 8:1 can be written as follows:

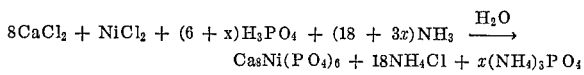

where $x$=the number of moles of excess $H_3PO_4$ employed for completeness of the precipitation. This procedure is described in more detail in U.S. Pats. 2,456,367 and 2,542,813. In this prior art process the calcium-nickel phosphate precipitate, recovered as a filter cake, requires extensive washing until free of halide, nitrate or other soluble impurities. It is also apparent that the prior process is wasteful of chemicals which, because of their low concentration in the aqueous filtrate, cannot be recovered economically. This amount of chemicals in the filtrate, however, presents a disposal problem, because the nitrogen and phosphate can promote undesirable vegetative growth in streams and ponds.

The over-all reaction of the process of this invention for making calcium-nickel phosphate catalysts having a Ca/Ni ratio of 8:1 can be described by the following formula:

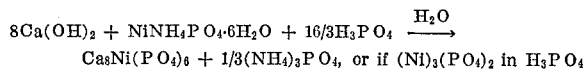

is used the following formula applies:

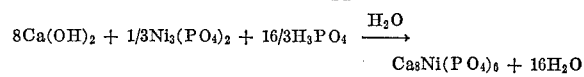

The advantages of the process of this invention are:
(1) The substitution of $Ca(OH)_2$ for the more expensive $CaCl_2$ and $NH_3$;

(2) the more efficient utilization of chemical raw materials;
(3) the mitigation of disposal and pollution problems; and
(4) since chlorides or nitrates are absent or are present in small amounts and the amount of total impurities as $(NH_4)_3PO_4$ is low or absent, washing of the catalyst is either unnecessary or facilitated. Tests have shown that when washing is practiced only about $\frac{1}{10}$ to $\frac{1}{20}$ the quantity of water is needed for the washing step of this invention as compared to that of the prior art procedures described above.

The calcium hydroxide can be present as an aqueous solution or as a slurry. The latter is preferred because it requires less volume of material for obtaining a given quantity of catalyst. In addition, aqueous solutions of coordination complexes or chelates of $Ca(OH)_2$, such as a dextrose, levulose, sucrose or maltose complex of $Ca(OH)_2$ can be employed, but is not preferred because of the added cost of the procedure.

The nickel compound in the aqueous $H_3PO_4$ solution can be provided in various ways. It can be present as a solution of a nickel halide or nitrate in $H_3PO_4$ solution or it can be provided as the result of reaction with aqueous $H_3PO_4$ and nickel hydroxide, nickel carbonate, basic nickel carbonate, nickel bicarbonate, or nickel oxide, or by the dissolution of nickel metal in $H_3PO_4$. Most preferably, a solution of nickel phosphate or nickel ammonium phosphate dissolved in an aqueous $H_3PO_4$ solution is employed.

The phosphoric acid can be partially neutralized, if desired, so that the $PO_4$ is provided in part as $Na_3PO_4$, $(NH_4)H_2PO_4$, $(NH_4)_2HPO_4$ or $(NH_4)_3PO_4$.

The temperature at which the reaction can be carried out will vary from the freezing point to the boiling point of the mixture, but the preferred temperature range is from about 20 to about 35–40° C., which is also the autogenous temperature under normal seasonal air temperature variations.

The volumetric inventory time can vary from about one minute or less to 10 hours or more. Preferably the reactants are fed at a rate which will maintain a pH 7–9, preferably 7.1 to 8.5 in the reaction vessel.

The reaction pressure is not critical, so that it can be carried out under vacuum, at atmospheric pressure or at superimposed pressures.

The process can be run either as a batch operation or on a continuous basis. In batch operations, the $Ca(OH)_2$ slurry and phosphoric acid solution containing the nickel or nickel salt are metered into a reactor at a rate such that a pH of 7–9 is maintained. The reaction mixture is stirred to obtain good contact of the reaction ingredients and to prevent local extremely high or very low pH values. After mixing the requisite amounts of ingredients, the reaction mixture is filtered, the filter cake is washed, if desired, dried, blended with a lubricant, such as graphite, and pelleted. In the continuous operation the feed ratios of $Ca(OH)_2$ slurry and nickel compound-phosphoric acid solutions are also metered into a reaction zone, agitated to obtain good contact between reactants and a portion of the reacted material containing a calcium nickel phosphate slurry is removed from the reaction zone in a volume about equal to that of reactants being fed. The removed slurry can be filtered, washed, dried and given the post-reaction treatment described under the batch procedure. An alternative continuous process comprises feeding a $Ca(OH)_2$ slurry and requisite amount of nickel compound-phosphoric acid solution into the bottom of a reactor, agitating, as above, and permitting the Ca-NiPO$_4$ slurry to overflow, collecting the so overflowed slurry, separating the precipitate from the mother liquor, washing the precipitate, drying, comminuting, screening, blending the catalyst with a lubricant and forming pellets. It is to be understood that the pH of 7–9 should be maintained regardless of the procedure used.

If desired, promoters such as $Cr_2O_3$ in amounts up to about 10% by weight of the Ca-Ni-$PO_4$ can be added before pelleting.

Prior to use, the catalyst is roasted in steam and air at about 550–700° C. to remove graphite, if it is added as a lubricant for the pelleting step.

The examples which follow are intended to illustrate but not to limit the invention. All parts are by weight unless otherwise specifically indicated.

EXAMPLE 1

An aqueous solution containing 0.038 moles $Ni^{++}$ per liter, 0.038 mole $NH_4^+$ per liter and 0.247 mole of $PO_4^\equiv$ per liter, was made by dissolving the requisite amounts of Ni-$NH_4$-$PO_4$ and $H_3PO_4$ in water. The solution had a specific gravity of 1.016 at 25° C.

A slurry containing 0.176 mole per liter of $Ca^{++}$ was prepared by slaking a commercial grade of quicklime in water. The $Ca(OH)_2$ or hydrated calcium oxide slurry and the aqueous acid solution of the nickel salt were added simultaneously to a reactor to which water had been added to provide efficient stirring. The slaked lime slurry and acid nickel salt solution were added at a rate such that the bulk pH of the liquid in the reactor was held at a value of 7.7–7.9. The temperature in the reactor was held at about 25° C. After 7 hours, 18.1 liters of the above nickel salt-phosphoric acid solution and 31.4 liters of the slaked lime slurry were fed to the reactor. The feeds were stopped and the precipitate was permitted to stand overnight. The solids were separated by filtration. On analysis the filtrate was found to contain 25 p.p.m. $Ca^{++}$, 18 p.p.m. $Ni^{++}$, 450 p.p.m. $PO_4^\equiv$ and 204 p.p.m. $NH_3$.

The filter cake was reslurried in water, refiltered, dried to constant weight at 200° C., pulverized and screened through a 12 mesh sieve. The catalyst contained 30.73% Ca, 5.28% Ni, and 56.09% $PO_4$. The ignition loss was 7.36%. The powder was mixed with 2% graphite and pressed into 3/16 inch x 3/16 inch pellets.

The catalyst was roasted at 650° C. in an atmosphere of steam and air to remove the graphite. It was then tested for its dehydrogenation activity. A bed of about 150 cc. of catalyst, supported on inert porcelain rings, was prepared in a one inch by 48 inch tube furnace equipped with heating controls and steam and butylene inlets, a water cooled condenser for condensing steam in the reactor effluent and drying sampling and metering means for the uncondensed organic vapors. The inlet gases are preheated to the reaction temperature by passage through a section of the inert rings above the catalyst bed. The test is conducted in cycles of one hour duration consisting of a 28 minute reaction period, a two minute steam purge, a 28 minute regeneration period with steam and air and a second two minute steam purge. The temperature for the first five cycles is maintained at 575° C., then raised during the sixth hour to 650° C. The test is terminated after the tenth cycle. Flow conditions for the process and regeneration portions of the cycle are as follows:

Process Butylene space velocity=300 v./v./hr.
   Steam to butylene ratio=20
Regeneration Air space velocity=400 v./v./hr.
   Steam space velocity=6000 v./v./hr.
The steam rate is maintained at 6000 v./v./hr. throughout the entire test period.

The activity of the catalyst is evaluated by analyzing a representative sample of the product gas by gas phase chromatography. The conversion is defined as the moles of butene consumed as a fraction of the moles of butene in the feed, expressed as percent. The selectivity is defined as the moles of butadiene in the product expressed as a fraction of the moles of butene consumed, expressed as percent.

The volumes of gas or vapor are all given in terms of 0° C. and 760 mm. pressure. Rates of flow of a gas or vapor through a bed of catalyst are expressed as "space velocities." Each space velocity is the liters of gas or vapor (expressed at 0° C. and 760 mm. pressure) fed to a catalyst bed per liter of the bed per hour.

The dehydrogenation activity of the catalyst of this example when tested by the procedure given above gave a conversion of butylene of 40.8% and a selectivity of 95.1% in the tenth cycle.

EXAMPLE 2

$Ni_3(PO_4)_2 \cdot 8H_2O$ was dissolved in dilute $H_3PO_4$ to provide a solution containing 0.063 mole $Ni^{++}$ per liter and 0.377 mole of $PO_4^\equiv$ per liter and having a specific gravity 1.026 at 25° C. This acid-nickel salt solution and a $Ca(OH)_2$ slurry containing 0.06 mole $Ca^{++}$ per liter were added simultaneously to the reactor at a rate such that the bulk pH was held at a value of 7.1. After 6 hours, 9.2 liters of the acid nickel salt solution and 66.8 liters of the lime slurry had been fed to the reactor. The feeds were stopped and the precipitate was permitted to stand overnight. The solids were separated by filtration. On analysis the filtrate was found to contain 62.7 p.p.m. $Ca^{++}$, 187 p.p.m. $Ni^{++}$ and 243 p.p.m. $PO_4^\equiv$.

The filter cake as reslurried in water, refiltered, dried to constant weight, pulverized, screened and pelleted. The dried cake contained 30.58% Ca, 6.22% Ni and 57.87% $PO_4$. The ignition loss was 5.33%. The dehydrogenation activity of the catalyst when tested as described above was 42.1% conversion of butylene to butadiene and a selectivity of 92.7% in the tenth cycle.

I claim:
1. A method of preparing a calcium-nickel phosphate dehydrogenation catalyst in which the atomic ratio of Ca to Ni ranges from about 6 to 9 comprising:
   commingling (1) aqueous calcium hydroxide with (2) in acidic solution containing a nickel salt dissolved in aqueous phosphoric acid in such quantities as to maintain a pH of 7 to 9 in the reactor, recovering and drying said phosphate.
2. The method of claim 1 in which the nickel salt is nickel phosphate.
3. The method of claim 1 in which the nickel salt is nickel chloride.
4. The method of claim 1 in which the nickel salt is nickel nitrate.
5. The method of claim 1 in which the pH of the reacting mixture is held at 7.1 to 8.5.
6. The method of claim 5 in which the pH of the said mixture is held at 7.1–8.0.
7. The method of claim 1 in which the nickel salt is nickel ammonium phosphate.
8. The method of claim 1 in which the nickel salt-phosphoric acid solution contains from 0–3 $NH_4$ groups for each atom of Ni.
9. The method of claim 1 in which the $Ca(OH)_2$ is fed to the reactor as an aqueous slurry.
10. The method of claim 1 in which the $Ca(OH)_2$ is fed to the reactor as an aqueous solution.

References Cited
UNITED STATES PATENTS

| | | | |
|---|---|---|---|
| 2,442,319 | 5/1948 | Britton et al. | 260—280 |
| 2,542,813 | 2/1951 | Heath | 23—105 |
| 3,149,081 | 9/1964 | Bowman et al. | 252—437 |
| 3,205,181 | 9/1965 | Bowman et al. | 252—437 |
| 3,298,966 | 1/1967 | Bagnetto | 252—437 |

OSCAR R. VERTIZ, Primary Examiner

G. A. HELLER, Assistant Examiner

U.S. Cl. X.R.

252—437; 260—683.15